(12) United States Patent
Bengtsson et al.

(10) Patent No.: US 9,386,419 B2
(45) Date of Patent: Jul. 5, 2016

(54) OPERATING A USER EQUIPMENT IN A WIRELESS COMMUNICATION NETWORK

(71) Applicant: Sony Corporation, Tokyo (JP)

(72) Inventors: Erik Bengtsson, Eslöv (SE); Ying Zhinong, Lund (SE)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/328,773

(22) Filed: Jul. 11, 2014

(65) Prior Publication Data

US 2016/0014566 A1 Jan. 14, 2016

(51) Int. Cl.
*H04W 24/00* (2009.01)
*H04W 4/02* (2009.01)
*H04W 64/00* (2009.01)
*H04W 72/02* (2009.01)
*H04W 72/04* (2009.01)
*H04B 7/02* (2006.01)

(52) U.S. Cl.
CPC ............. *H04W 4/026* (2013.01); *H04B 7/024* (2013.01); *H04W 64/003* (2013.01); *H04W 72/02* (2013.01); *H04W 72/046* (2013.01); *H04W 72/048* (2013.01)

(58) Field of Classification Search
None
See application file for complete search history.

(56) References Cited

U.S. PATENT DOCUMENTS

| 6,850,785 | B1 * | 2/2005 | Leyten | H01Q 1/242 343/702 |
| 2011/0063168 | A1 | 3/2011 | Skarp | |
| 2012/0009964 | A1 * | 1/2012 | Gormley | H04B 7/0634 455/509 |

FOREIGN PATENT DOCUMENTS

EP 2 284 561 2/2011
WO WO 2012/143936 10/2012

OTHER PUBLICATIONS

International Search Report and Written Opinion for corresponding Application No. PCT/EP2014/077342 mailed May 20, 2015.

* cited by examiner

*Primary Examiner* — Martin Mushambo
(74) *Attorney, Agent, or Firm* — Renner, Otto, Boisselle & Sklar, LLP

(57) ABSTRACT

The present invention relates to methods for operating a user equipment in a wireless communication network and user equipments for a wireless communication network.

12 Claims, 1 Drawing Sheet

OPERATING A USER EQUIPMENT IN A WIRELESS COMMUNICATION NETWORK

FIELD OF THE INVENTION

The present invention relates to a method for operating a user equipment in a wireless communication network and a user equipment for a wireless communication network. Especially, the present invention relates to configuring a transmission pattern of an antenna device of the user equipment for establishing and maintaining a wireless communication between the user equipment and the wireless communication network.

BACKGROUND OF THE INVENTION

A radio frequency transmission in a high frequency band, for example in a frequency range of 10 GHz up to about 100 GHz, may provide a considerable bandwidth for data and voice communication in wireless communication networks. At these high frequencies the wavelength of the radio frequency signals is very short in the magnitude of millimeters and therefore these frequencies bands are called millimeter waves. As the wavelength is very small and in order to achieve decent performance, multiple antennas, e.g. in the shape of an array, may be used in a user equipment. The user equipment may comprise for example a mobile telephone or a tablet PC. A use of such an antenna arrangement comprising for example ten or more antenna elements, may offer a high antenna gain with a correct phasing of the antenna elements. However, the phasing narrows the antenna radiation into a beam and this beam needs to be directed towards the base station. In the same way, a direction of high reception sensitivity has to be configured such that it is directed towards the base station to achieve a high antenna gain. Especially in case the user equipment is moving, a correct phasing and configuration of the antenna arrangement is crucial and may raise problems. Therefore, there is a need for an improved operation of a user equipment in such a wireless communication network.

SUMMARY OF THE INVENTION

According to an embodiment, a method for operating a user equipment in a wireless communication network is provided. The user equipment comprises an antenna device providing a configurable transmission pattern. The configurable transmission pattern may relate to a configuration of a reception pattern of the antenna device as well as to a sending pattern of the antenna device. According to the method, an orientation of the user equipment is determined with an orientation determining sensor of the user equipment. The orientation determining sensor may comprise for example a gyrometer, a gravity sensor, an accelerometer or a compass. Such orientation determining sensors may be available in user equipments like mobile telephones or tablet PCs for gaming applications or automatic adaption of a graphical user interface. Furthermore, a user equipment position of the user equipment is determined with a positioning determining sensor of the user equipment. The user equipment position may relate for example to an absolute geographical position of the user equipment or may relate to a relative geographical position of the user equipment with respect to a known reference. The positioning determining sensor may comprise for example a sensor or system for receiving signals from a global positioning system, like GPS or Galileo, a gyrometer, an accelerometer and/or a compass. Furthermore, determining the position of the user equipment may be based on triangulation of radio frequency signals from a cellular communication system, a Bluetooth beacon system, a wireless local area network or any other radio frequency system. Next, at the user equipment, a base station position of a base station of the wireless communication network is determined. The base station may comprise any kind of a base station of a wireless communication network, for example a base station of a cellular wireless communication network or an access point of for example a wireless local area network. Based on the determined orientation, the determined user equipment position and the determined base station position, the transmission pattern of the antenna device is automatically configured. In other words, using sensors of the user equipment in combination with a known location of an access point or a base station, the antenna device of the user equipment, for example an antenna arrangement, is configured. Therefore, while using sensors like an accelerometer, compass and a positioning unit of the user equipment, the antenna pattern may be adaptively steered towards the base station or access point. Furthermore, an algorithm for beam scanning may prioritize directions determined based on the orientation and positions of the user equipment and the base station in order to increase the likelihood of finding a base station or an access point.

Additionally, if the user equipment looses contact to the base station, based on the determined orientation the user equipment may use the same elevation as before to re-establish the contact to the base station. In this context, the term "base station" may comprise any kind of base stations, e.g. base stations of a cellular mobile communication network, access points of a wireless local area network, or any other hub. Furthermore, in a device-to-device communication, the "base station" may comprise another user equipment, as in a device-to-device communication also other user equipments may be contacted preferably in the horizontal plane.

According to an embodiment, for determining the orientation of the user equipment, the orientation of the user equipment with respect to a geological horizon may be determined. Furthermore, the transmission pattern of the antenna device may be configured such that the transmission pattern is leveled along the geological horizon in a direction of the determined base station position. As in most cases a base station is located along a horizontal plane, this knowledge may be utilized to steer and configure the transmission pattern of the antenna device. Furthermore, when the user equipment is searching for a base station or an access point of a wireless communication network to set up a communication link with the wireless communication network or to register at the wireless communication network, directions in the geological horizon may be prioritized in order to increase the likelihood of finding a base station or an access point. In other words, directions along the geological horizon may be searched first to contact a base station or an access point.

Levelling the transmission pattern along the horizon as it is used in this description includes a levelling approximately to the horizon, e.g. in an angle of up to +/−20 to 30 degrees with respect to a horizontal direction.

According to another embodiment, the base station position may be determined for example by looking up the base station position in a map which may be stored in the user equipment or may be retrieved by the user equipment, and further based on the current position of the user equipment. For example, a map may be provided at the user equipment indicating a plurality of positions of a plurality of base stations. Based on its own position, the user equipment may determine a plurality of base station positions in a close environment of the user equipment within for example a radius of a few hundred meters or a few kilometers, and the user equipment may configure the transmission pattern of the antenna device such that the antenna pattern is directed in the direction of one of the determined base stations. Additionally or as an alternative, the base station position may be retrieved from a data base of the user equipment which may indicate for example absolute geological positions of a plurality of base stations. The base station positions of the data base may have been stored by the user equipment before into the database based on formerly established communication links between the user equipment and the base stations. Therefore, history data concerning base station positions formerly contacted by the user equipment, may be collected and utilized by the user equipment for finding a base station and configuring the transmission pattern of the antenna device of the user equipment accordingly.

According to another embodiment, the antenna device comprises a plurality of antenna elements arranged in a one dimensional arrangement providing an at least partially disk shaped transmission pattern. For configuring the transmission pattern of the antenna device, the at least partially disk shaped transmission pattern is aligned with the geological horizon. Especially for radio frequency transmissions at frequencies below about 30 GHz, the number of antenna elements may be in a range of 4 to 16 and these antenna elements may be arranged in a one dimensional arrangement. By aligning the at least partially disk shaped transmission pattern of the antenna device with the geological horizon, a coverage of the antenna device is optimized along the horizon where in most cases a base station or an access point of the wireless communication network can be found.

According to another embodiment, the antenna device comprises a plurality of antenna elements arranged in a two dimensional arrangement providing a pencil beam shaped transmission pattern. The transmission pattern of the antenna device is configured such that the geological horizon may be scanned with the pencil beam shaped transmission pattern. For radio frequency transmissions at frequencies above approximately 30 GHz, the number of antenna elements may be much more than 10, for example 20 to 100. Furthermore, the antenna elements may be arranged in a two dimensional arrangement and consequently the directivity of the antenna pattern will increase. The resulting antenna pattern is therefore called a pencil beam shaped transmission pattern. As in most cases a base station or an access point of the wireless communication network is arranged along the horizon, finding a base station or an access point may be enhanced by scanning along the geological horizon first or at least with a higher priority. In the same way, maintaining a set up communication link between the user equipment and the base station may prioritize to move or scan the pencil beam shaped transmission pattern along the geological horizon.

According to another embodiment, a method for operating a user equipment in a wireless communication network is provided. The user equipment comprises an antenna device providing a configurable transmission pattern. According to the method, a current direction of the transmission pattern of the antenna device is determined while a communication link is established between the user equipment and a base station of the wireless communication network via the antenna device. Furthermore, a user equipment movement indicating a movement of the user equipment is determined with a movement determining sensor of the user equipment. The transmission pattern of the antenna device is reconfigured based on the determined current direction of the transmission pattern and the determined user equipment movement. Therefore, when a communication link is established between the user equipment and the base station, sensors of the user equipment like an accelerometer, a compass, a gyrometer, a gravity sensor and/or a sensor for receiving signals from a global positioning system, may be utilized to adaptively steer the antenna pattern towards the base station when the user equipment is moved or rotated by the user.

According to another embodiment, a user equipment for a wireless communication network is provided. The user equipment comprises an antenna device for receiving radio frequency signals from a base station of the wireless communication network. Furthermore, the antenna device provides a configurable transmission pattern. The user equipment comprises furthermore an orientation determining sensor for determining a current orientation of the user equipment or for determining an orientation change of the user equipment. The user equipment comprises additionally a positioning determining sensor for determining a current user equipment position, and a processing device configured to determine a position of a base station of the wireless communication network and to configure the transmission pattern of the antenna device based on the determined orientation, the determined user equipment position and the determined base station position. By using the orientation of the user equipment and the position of the user equipment and the base station, the antenna device of the user equipment is automatically configured such that the base station may be reliably contacted with a high radio frequency signal quality, which may enable to set up a radio frequency link or to maintain a set up radio frequency signal link.

According to a further embodiment, a user equipment for a wireless communication network is provided. The user equipment comprises an antenna device for receiving and sending radio frequency signals from and to a base station of the wireless communication network. The antenna device has a configurable transmission pattern, i.e., the directionality of a sending direction as well as a directionality of a receiving direction of the antenna device may be configurable. The user equipment comprises furthermore a movement determining sensor for determining a user equipment movement. The movement of the user equipment may comprise for example a translational movement and/or a rotational movement of the user equipment. The user equipment may comprise corresponding sensors, for example a gyrometer, a gravity sensor, an accelerometer, a compass, and a sensor for receiving signals from a global positioning system like GPS. The user equipment comprises furthermore a processing device configured to determine a current direction of the transmission pattern of the antenna device while a communication link is established between the user equipment and the base station of the wireless communication network via the antenna device. Based on the determined current direction of the transmission pattern and the determined user equipment movement, the processing device may reconfigure the transmission pattern of the antenna device. Therefore, if the user equipment has a link set up to the base station, any movement of the user equipment may be sensed and a compensation to the beam steering of the antenna device may be configured in order to maintain the connection or in order to narrow down the scanning area if the connection is lost.

The user equipment may comprise for example a mobile telephone, especially a so called smartphone, a mobile computer, a mobile digital assistant, a tablet computer, a television set, a monitor, or a projector. E.g., a projector may know from sensors or configuration if it is installed at a ceiling, wall or on a desk and the transmission pattern may be configured based on this information.

Although specific features described in the above summary and the following detailed description are described in connection with specific embodiments and aspects of the present invention, it should be understood that the features of the exemplary embodiments and aspects may be combined with each other unless specifically noted otherwise.

BRIEF DESCRIPTION OF THE DRAWINGS

The present invention will now be described in more detail with reference to the accompanying drawings.

DESCRIPTION OF PREFERRED EMBODIMENTS

In the following, exemplary embodiments of the present invention will be described in more detail. It is to be understood that the features of the various exemplary embodiments described herein may be combined with each other unless specifically noted otherwise. Any coupling between components or devices shown in the figures may be a direct or indirect coupling unless specifically noted otherwise.

Figure 1:
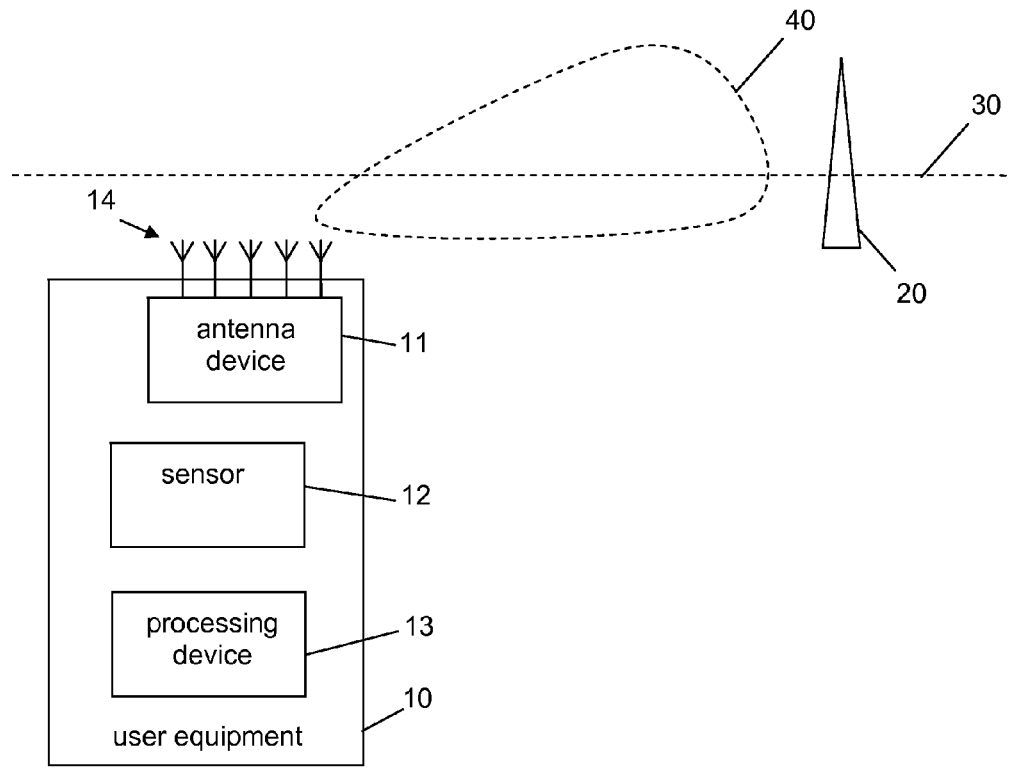
FIG. 1 shows schematically a user equipment according to an embodiment of the present invention.

FIG. 1 shows a user equipment 10 and a base station 20 of a wireless communication network, for example a cellular wireless communication network or a wireless local area network. The user equipment 10 comprises an antenna device 11 having a plurality of antenna elements 14, a sensor 12 which will be described in more detail below, and a processing device 13. A communication between the user equipment 10 and the base station 20 may be accomplished by radio frequency signals in a predetermined frequency band in a frequency range of 10 GHz up to about 100 GHz. As the wavelength at these frequencies is very small, the antenna device 11 and preferably also corresponding antenna devices of the base station 20 may comprise multiple antenna elements 14, e.g. arranged in an array of rows and columns, and configured such that a resulting transmission pattern of the antenna device 11 has a directional characteristic. For example, a two dimensional arrangement of a plurality of antenna elements 14, for example 10 to 100 antenna elements or even more, may be configured such that a directional transmission pattern may be achieved as indicated by reference sign 40 in FIG. 1. Such a directionality of the antenna elements 14 may be achieved by a corresponding configuration of transceiver units assigned to the antenna elements 14 which provide a correct phasing of the antenna elements. Therefore, a reception sensitivity of the antenna device 11 may be very high in a certain narrow direction and also an antenna signal sent from the antenna device 11 may have high energy in a certain narrow direction. It is to be noticed that the term "transmission" as it is used in the present description, may comprise for sending a signal from the antenna device 11 as well as receiving a radio frequency signal at the antenna device 11.

For setting up a communication connection between the user equipment 10 and the base station 20, the above-described directionality of the transmission pattern needs to be directed towards the base station 20. Such a directed transmission pattern may also be called "beam" and in particular "pencil beam". A corresponding configuration of the antenna device 11 may be performed by the processing device 13 with the help of sensor data from the sensor 12 as will be described in the following in connection with FIGS. 2 and 3.

Figure 2:
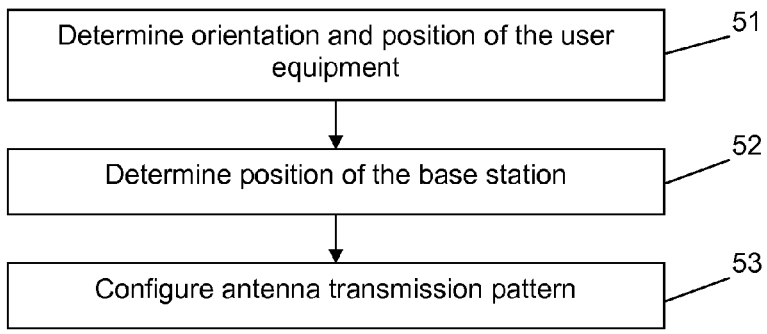
FIG. 2 shows a flowchart comprising method steps for operating a user equipment in a wireless communication network according to an embodiment of the present invention.

FIG. 2 shows an embodiment for operating the user equipment 10 in a wireless communication network. In step 51 the processing device 13 determines an orientation and position of the user equipment 10. Therefore, the sensor 12 indicated in FIG. 1 may comprise for example a gyrometer, a gravity sensor, an accelerometer, a compass, and/or a sensor for receiving a signal from a global positioning system, for example from a GPS system. Additionally or as an alternative, the processing device 13 may determine the position of the user equipment based on triangulation of radio frequency signals from a cellular communication system, a Bluetooth beacon system, a wireless local area network or any other radio frequency system. In step 52 the processing device 13 determines a position of the base station 20. For example, the user equipment 10 may provide a database comprising a map in which positions of base stations are indicated. Additionally, for example during a handover from one base station to a neighbouring base station, the one base station may communicate a location of the neighbouring base station to the user equipment and may communicate a location of the user equipment to the neighbouring base station in order to configure the transmission patterns of the user equipment and the neighbouring base station towards each other. Based on the position of the user equipment 10 determined in step 51, the processing device 13 may determine in the map a position of a base station 20 in a close environment of the current position of the user equipment 10. Furthermore, based on the determined position of the base station 20 in the environment of the user equipment 10, the processing device 13 may configure in step 53 the antenna transmission pattern of the antenna device 11 such that a main direction or beam 40 of the antenna device 11 is directed into the direction of the determined position of the base station 20. Additionally or as an alternative, the positions of base stations may be retrieved by the user equipment 10 from a database stored in the user equipment 10. Entries in the database may have been made by the user equipment 10 itself before based on formerly established communication links between the user equipment 10 and the corresponding base stations. Therefore, when the user equipment is moving in an environment where it has been operated before, the positions of the base stations in this environment may have been learned by the user equipment. Therefore, if a communication link is to be set up between the user equipment in a known place and a base station, the user equipment knows the direction of the base station and can narrow down the scanning area for configuring the transmission pattern of the antenna device 11. Hence, a lock in time for a communication link to be established can be shortened significantly as the scanning area may be narrowed down.

Figure 3:
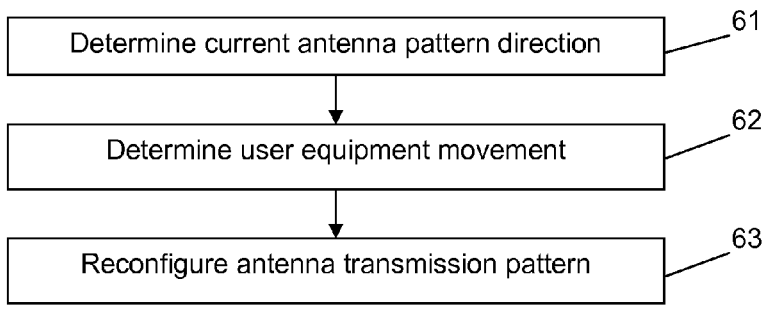
FIG. 3 shows a flowchart comprising method steps for operating a user equipment in a wireless communication network according to another embodiment of the present invention.

FIG. 3 shows another embodiment of a method for operating the user equipment 10 in a wireless communication network. In step 61 a current antenna pattern direction is determined. For example, if a communication link is established between the user equipment 10 and the base station 20 via the antenna device 11, a current configuration of the antenna device 11 may be retrieved by the processing device 13. In step 62, a movement of the user equipment 10 is determined. The movement of the user equipment 10 may comprise for example a translational movement and/or a rotational movement of the user equipment. Therefore, the user equipment 10 may comprise for example a gyrometer, a gravity sensor, an accelerometer, a compass and a sensor for receiving a signal from a global positioning system as the sensor 12. Additionally or as an alternative, the processing device 13 may determine the movement of the user equipment based on triangulation of radio frequency signals from a cellular communication system, a Bluetooth beacon system, a wireless local area network or any other radio frequency system. Based on these methods a movement of the user equipment 10 may be determined accurately, and based on this information, in step 63, the antenna transmission pattern of the antenna device 11 may be reconfigured such that the main direction or beam 40 of the antenna elements 14 may be steered to focus on the base station 20. Therefore, if the user equipment 10 has set up a communication link to the base station 20, any movement of the user equipment 10 may be sensed and compensated in order to maintain the connection or in order to narrow down the scanning area if the connection is lost. As described above, the sensor information may be used to steer the beam of an arrangement of antenna elements, but it may also be used to select different antenna arrangements, possibly in combination with other algorithms. Furthermore, if the connection to the base station 20 is lost, the user equipment 10 may configure the antenna device 11 such that directions along a geographical horizon 30 shown in FIG. 1 may be scanned with a higher priority or at first, as usually a base station 20 may be found along the horizon 30.

To sum up, according to the above-described embodiments, sensor information of the sensor 12 is used in combination with a known location of a base station to configure the antenna device 11. With the knowledge that a base station is in most cases arranged along the horizontal plane and the fact that there are sensors in modern user equipments, like for detecting of up and down, 3D acceleration and a compass, a beam steering may be implemented. The above-described methods may be implemented as a system requirement in a wireless communication network and hence be standardized, but may also be implemented as a smart feature of the user equipment only. Assuming that the user equipment 10 knows the direction to the base station 20, either as it is already connected or from history or a map or from information communicated from a macro cell, this knowledge may be combined with the knowledge of its own orientation, position and velocity. This may enable the user equipment 10 to direct a beam 40 of the antenna device 11 more efficiently.

The invention claimed is:

1. A method for operating a user equipment in a wireless communication network, wherein the user equipment comprises an antenna device providing a configurable transmission pattern, the method comprising:
   determining an orientation of the user equipment with respect to a geological horizon using an orientation determining sensor of the user equipment,
   determining a user equipment position of the user equipment with a position determining sensor of the user equipment,
   determining, at the user equipment, a base station position of a base station of the wireless communication network, and
   configuring the transmission pattern of the antenna device based on the determined orientation, the determined user equipment position, and the determined base station position.

2. The method according to claim 1, wherein configuring the transmission pattern of the antenna device comprises leveling the transmission pattern along the geological horizon in a direction of the determined base station position.

3. The method according to claim 1, wherein the orientation determining sensor comprises at least one of a group comprising a gyrometer, a gravity sensor, an accelerometer, and a compass.

4. The method according to claim 1, wherein the position determining sensor comprises at least one of a group comprising a sensor for receiving a signal from global positioning system, a gyrometer, an accelerometer, a compass, and a sensor for determining the position based on triangulation of radio frequency signals from a cellular communication system, a Bluetooth beacon system, a wireless local area network or any other radio frequency system.

5. The method according to claim 1, wherein determining the base station position comprises at least one of:
   looking up the base station position in a map based on the user equipment position,
   retrieving the base station position from a database of the user equipment, wherein the base station position has been stored in the database by the user equipment before based on a formerly established communication link between the user equipment and the base station, and
   receiving the base station position from a macro cell of the wireless communication network.

6. The method according to claim 1, wherein the antenna device comprises a plurality of antenna elements arranged in a one-dimensional arrangement providing an at least partially disc shaped transmission pattern, wherein configuring the transmission pattern of the antenna device comprises aligning the at least partially disc shaped transmission pattern with the geological horizon.

7. The method according to claim 1, wherein the antenna device comprises a plurality of antenna elements arranged in a two-dimensional arrangement providing a pencil beam shaped transmission pattern, wherein configuring the transmission pattern of the antenna device comprises scanning the geological horizon with the pencil beam shaped transmission pattern.

8. A method for operating a user equipment in a wireless communication network, wherein the user equipment comprises an antenna device providing a configurable transmission pattern, the method comprising:
   determining a current direction of the transmission pattern of the antenna device while a communication link is established between the user equipment and a base station of the wireless communication network via the antenna device,
   determining a user equipment movement of the user equipment with a movement determining sensor of the user equipment, and
   reconfiguring the transmission pattern of the antenna device based on the determined current direction of the transmission pattern and the determined user equipment movement.

9. A user equipment for a wireless communication network, comprising:
   an antenna device for receiving radio frequency signals from a base station of the wireless communication network, wherein the antenna device provides a configurable transmission pattern,
   an orientation determining sensor for determining an orientation of the user equipment with respect to a geological horizon,
   a position determining sensor for determining a user equipment position of the user equipment, and
   a processing device configured to determine a base station position of a base station of the wireless communication network and to configure the transmission pattern of the antenna device based on the determined orientation, the determined user equipment position, and the determined base station position.

10. The user equipment according to claim 9, wherein the user equipment comprises at least one of a group consisting of a mobile telephone, a mobile computer, a personal digital assistant, a tablet computer, a television set, a monitor, and a projector.

11. A user equipment for a wireless communication network, comprising:
   an antenna device for receiving radio frequency signals from a base station of the wireless communication network, wherein the antenna device provides a configurable transmission pattern,
   a movement determining sensor for determining a user equipment movement of the user equipment, and
   a processing device configured to determine a current direction of the transmission pattern of the antenna device while a communication link is established between the user equipment and a base station of the wireless communication network via the antenna device, and to reconfigure the transmission pattern of the antenna device based on the determined current direction of the transmission pattern and the determined user equipment movement.

12. The user equipment according to claim 10, wherein the user equipment comprises at least one of a group consisting of a mobile telephone, a mobile computer, a personal digital assistant, a tablet computer, a television set, a monitor, and a projector.

* * * * *